United States Patent
Giuli et al.

(10) Patent No.: US 8,681,023 B2
(45) Date of Patent: Mar. 25, 2014

(54) METHOD AND APPARATUS FOR VEHICLE TRACKING

(75) Inventors: Thomas J. Giuli, Ann Arbor, MI (US); Joseph N. Ross, Ann Arbor, MI (US); Mark Schunder, Dearborn, MI (US); Thomas Richard Alexander, Canton, MI (US); Joseph Paul Rork, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 428 days.

(21) Appl. No.: 13/038,484

(22) Filed: Mar. 2, 2011

(65) Prior Publication Data

US 2012/0223844 A1   Sep. 6, 2012

(51) Int. Cl.
*G08G 1/123* (2006.01)

(52) U.S. Cl.
USPC .......................................... 340/993; 340/994

(58) Field of Classification Search
USPC ................... 340/993, 994, 502, 504, 995.13; 701/465
See application file for complete search history.

(56) References Cited

U.S. PATENT DOCUMENTS

| | | | |
|---|---|---|---|
| 6,879,836 B2 * | 4/2005 | Nakamoto et al. | 340/994 |
| 7,064,681 B2 * | 6/2006 | Horstemeyer | 340/994 |
| 7,319,414 B2 * | 1/2008 | Horstemeyer | 340/994 |
| 2012/0154174 A1 | 6/2012 | Schunder | |

OTHER PUBLICATIONS

Ford Motor Company, "SYNC with Navigation System," Owner's Guide Supplement, SYNC System Version 1 (Jul. 2007).
Ford Motor Company, "SYNC," Owners's Guide Supplement, SYNC System Version 1 (Nov. 2007).
Ford Motor Company, "SYNC with Navigation System," Owner's Guide Supplement, SYNC System Version 2 (Oct. 2008).
Ford Motor Company, "SYNC," Owner's Guide Supplement, SYNC System Version 2 (Oct. 2008).
Ford Motor Company, "SYNC with Navigation System," Owner's Guide Supplement, SYNC System Version 3 (Jul. 2009).
Ford Motor Company, "SYNC," Owner's Guide Supplement, SYNC System Version 3 (Aug. 2009).
Kermit Whitfield, "A hitchhiker's guide to the telematics ecosystem," Automotive Design & Production, Oct. 2003, http://findarticles.com, pp. 103.

* cited by examiner

*Primary Examiner* — John A Tweel, Jr.
(74) *Attorney, Agent, or Firm* — Jennifer M. Stec; Brooks Kushman P.C.

(57) ABSTRACT

A computer-implemented tracking method includes receiving a tracking request at a vehicle associated computing system (VACS). The method also includes authenticating the tracking request and determining a vehicle location via a GPS in communication with the VACS. The method further includes transmitting the vehicle location from the VACS to a tracking request associated computing system (TRACS). The method also includes monitoring the vehicle for at least one delay-event. The method additionally includes transmitting data corresponding to the delay event to the TRACS, contingent on the occurrence of at least one delay-event.

14 Claims, 5 Drawing Sheets

METHOD AND APPARATUS FOR VEHICLE TRACKING

TECHNICAL FIELD

The illustrative embodiments generally relate to a method and apparatus for vehicle tracking.

BACKGROUND

Whether driving across town to meet a friend, or driving across country to meet a relative, drivers often like to provide the person they're meeting with an estimated time of arrival. This helps the person being met plan their schedule accordingly, so they can ensure that they're present when the traveler arrives.

Unfortunately, due to weather, road repair, traffic, detours, unplanned stops, etc., travelers are often delayed, and many times they may not arrive anywhere near the estimated arrival time. While the frequency of cellular phones has made it easier to call and update an estimated arrival time, a driver may often not think to do this at each point of delay, or their phone may have died, or there may be a myriad of other reasons why they cannot or do not update their arrival time.

Additionally, emergencies or other reasons may arise why a person being met needs to briefly leave the house. Of course, unless they know with reasonable certainty that their guest is not expected to arrive while they're gone, they may not leave the house in these circumstances, lest their guest be stuck waiting for them to return upon the guest's arrival.

Numerous cars come equipped with GPS systems or other navigation systems, that allow the vehicle to know where it is geographically located. Additionally, vehicles may even have cameras on-board that allow the vehicle to take a photograph of its present location.

SUMMARY

In a first illustrative embodiment, a computer-implemented tracking method includes receiving a tracking request at a vehicle associated computing system (VACS). The illustrative method also includes authenticating the tracking request and determining a vehicle location via a GPS in communication with the VACS.

The illustrative method further includes transmitting the vehicle location from the VACS to a tracking request associated computing system (TRACS). The illustrative method also includes monitoring the vehicle for at least one delay-event. The illustrative method additionally includes transmitting data corresponding to the delay event to the TRACS, contingent on the occurrence of at least one delay-event.

In a second illustrative embodiment, a computer-implemented method includes receiving, at a tracking request associated computing system (TRACS), data associated with a vehicle-delay event, the data including at least coordinates of a vehicle. The illustrative method also includes determining, using the TRACS, if a location-type can be correlated with the coordinates of the vehicle.

Additionally, the illustrative method includes estimating a delay associated with the location-type, using the TRACS and contingent on the determining. The illustrative method further includes adjusting an estimated arrival time based at least in part on the estimated delay. The illustrative method additionally includes conveying the estimated arrival time from the TRACS to a requesting party.

In a third illustrative embodiment, a computer readable storage medium storing instructions that, when executed, cause a vehicle associated computing system (VACS) to execute a method including receiving a tracking request at the VACS. The illustrative method also includes authenticating the tracking request and determining a vehicle location via a GPS in communication with the VACS. The illustrative method further includes transmitting the vehicle location to a tracking request associated remote source (TRACS).

Additionally, the illustrative method includes monitoring the vehicle for at least one delay-event and, contingent on the occurrence of at least one delay-event, transmitting data corresponding to the delay event to the TRACS.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In order to better coordinate arrival of guests with a host's (or person the driver is meeting, etc.) presence, it may be useful to have a means of tracking, in real time, the present location of a traveling vehicle. If a host can see where a vehicle is along a route, the host can then have a better idea of when the vehicle will actually arrive at the destination. Although a host is used as an example, the vehicle could also be traveling to a meeting place, such as a business or restaurant, and the party already present may want to know, for example, an estimated arrival time so that they can delay a meeting, place a request for a table, etc.

Since it might be inconvenient and even possibly dangerous to repeatedly call the traveling party for updates, and since the traveling party may be unfamiliar with the area through which they are traveling, and thus unable to provide accurate location information, by using the vehicle's GPS coordinates as a reference against a known map, the location, distance, and estimated arrival time of the vehicle may be known.

Figure 1:
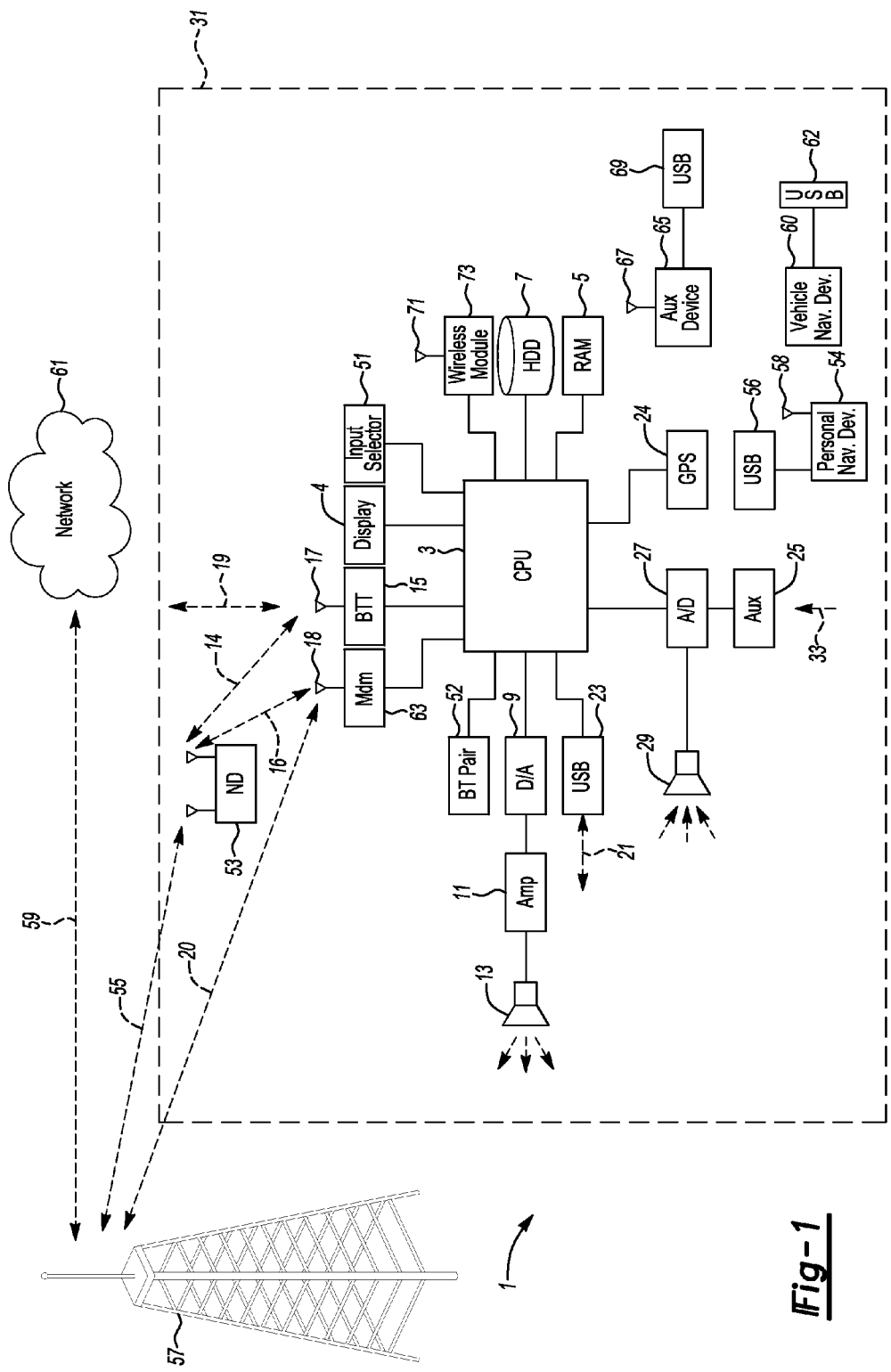
FIG. 1 shows an illustrative example of a vehicle computing system.
Figure 2:
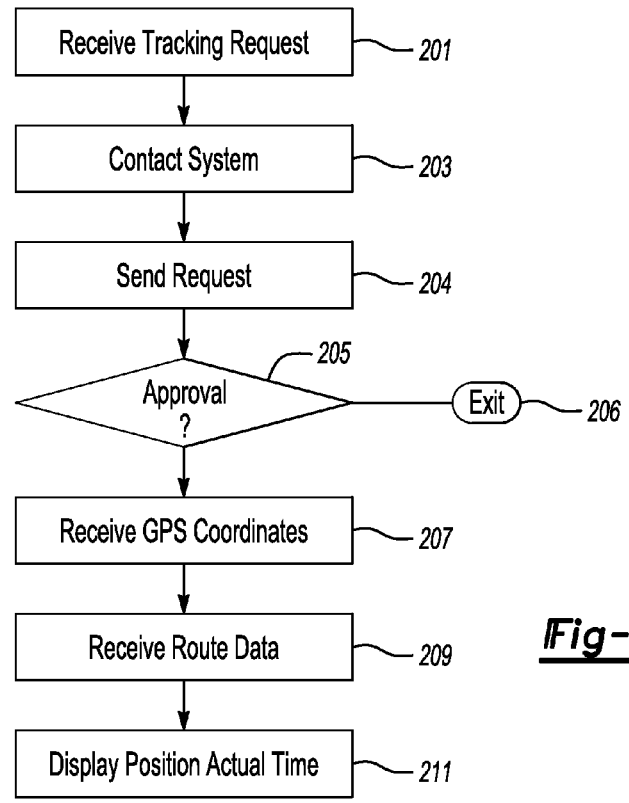
FIG. 2 shows an illustrative example of a tracking request process.

In a first illustrative embodiment, shown in FIG. 2, a vehicle tracking system (such as, but not limited to, a server remote from the vehicle) receives a vehicle tracking request. Additionally or alternatively, the querying party could, for example, send the request directly from a smart phone to a vehicle (if, for example, the smart phone had mapping capability). Other means of receiving and transmitting the request and requested data are also possible, these examples are merely provided as several exemplary scenarios.

In this illustrative embodiment, a remote server receives the request 201, and contacts the vehicle 203. The contact could be over a connection established through a wireless device in communication with a vehicle, it could be to a device permanently in communication with a vehicle, it could be over a wireless networking connection, etc.

Once the vehicle has been contacted, the remote server sends a request to the vehicle for authentication purposes 204. For privacy reasons, most, if not all, drivers may not want to simply be able to be tracked by any party, so in this illustrative embodiment, the vehicle authenticates the request.

In one illustrative embodiment, the authentication is a one-time process per trip per querying party. So, for example, in this system, once a party has been authenticated a first time during a trip, that party no longer needs to be authenticated to track the vehicle for the rest of the journey. The authentication could be stored on a server, or the authentication could be stored vehicle-side, and each subsequent request could be automatically approved for the duration of the journey.

In another illustrative embodiment, a vehicle owner provides a tracking party with a vehicle identification code. This could be a permanent code, or it could be a code that changes each trip. As long as the code is transmitted along with the request, in this embodiment, the vehicle will confirm the validity of the tracking request. It may be desirable to have the code be user-definable, at least, since an unchangeable code could be used by someone who was given the code previously, but now, for whatever reason, the driver does not wish to have that person use the code. The code could simply be a password, for example, or it could be a numeric, alphabetical, alphanumeric, etc. code generated by a vehicle computing system or a user.

In yet a further illustrative embodiment, querying parties may be identified as "always approved." For example, if a parent wanted to track the vehicle of a child, the parent could set up a system such that a parent's requests could not be denied by the vehicle occupant.

These are but a few illustrative examples of how authentication can be processed, although other means for identification that are known and applicable are also contemplated as being usable with the illustrative embodiments and within the scope of the invention. Approval is discussed further with respect to the example shown in FIG. 3.

After the remote server requests authentication, the system checks to see if authentication was approved 205. If the request was denied, the process exits 206. Otherwise, the process may then receive GPS coordinates of the vehicle 207. Although GPS coordinates are used in this example, that is just one example of a common positioning system, and any suitable means of determining the vehicle's location may be implemented. In addition to the GPS coordinates, in this illustrative embodiment, route data is also received 209.

In this embodiment, the vehicle is equipped with a navigation system, and route data to a destination programmed into the navigation system is received. In other words, the data for the currently programmed destination is received. This destination, however, may not correspond to the location of the querying party. For example, without limitation, if a driver was an hour into a four hour trip, but had reprogrammed the navigation system to find a local gas station, the querying party would receive information pertaining to the estimated arrival time of the driver at the local gas station.

Since it is unlikely that this is the arrival time that is being sought, it may also be possible to provide a destination to accompany the query, such that the remote server (querying phone, etc.), once receiving the current GPS location of the car, can then calculate an estimated arrival time to the entered destination.

It may also be the case, for example, that the querying party is inputting the query from a device equipped with a GPS system of its own (such as, but not limited to, a smart phone). In this instance, the phone itself may actually transmit the "end location" as that of the querying device, thus eliminating the need for inclusion of a final destination in the query.

Once the proper destination is known, through any of the exemplary methods presented herein, or through other suitable methods, the querying server (phone, etc.) can then calculate an estimated arrival time and display, for example, the current position of the traveling vehicle 211. Although not shown, the calculated arrival time may take into account factors such as, but not limited to, weather conditions, traffic conditions, known detours, vehicle average speed over the journey so far, etc. By including factors such as these, a fairly accurate (barring any other stops) estimation of arrival time can be obtained.

Figure 3:
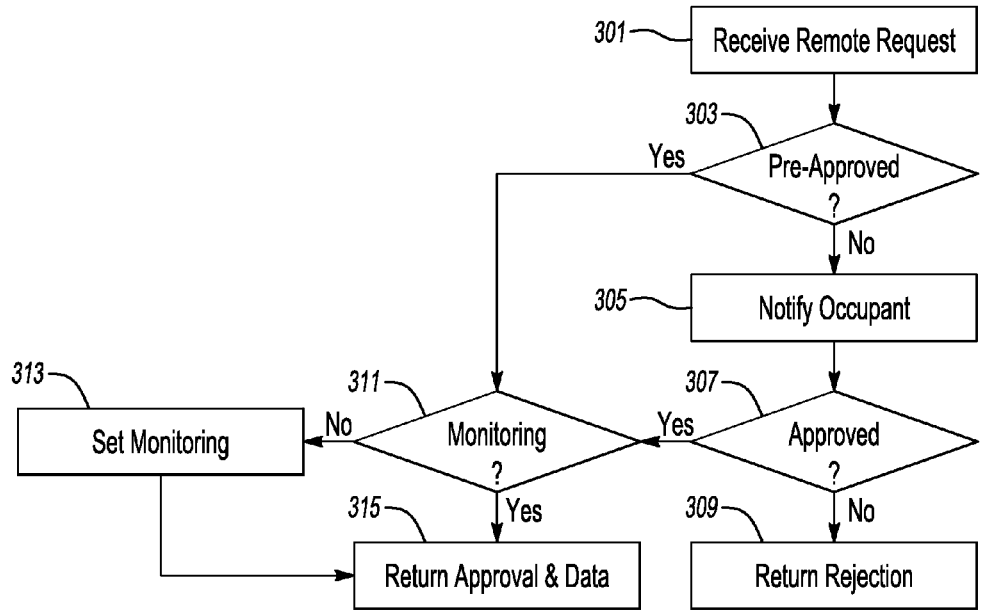
FIG. 3 shows one example of an approval process.

FIG. 3 shows one example of an approval process. In this illustrative embodiment, the vehicle computing system (or, for example, a smart phone or other device paired with the vehicle computing system, containing an application designed to perform one or more of the illustrative embodiments), receives a request for tracking the vehicle 301.

In this embodiment, the driver is capable of pre-approving requests and/or the system "remembers" parties that have been previously approved for tracking over the present journey. If the request is not pre-approved 303, the vehicle computing system, in this embodiment, notifies the occupant that a request is pending approval 305. This could be a verbal, visual or other suitable notification. Similarly, the occupant can respond to the notification with a verbal input (such as, but not limited to, "approved" or "denied") or a physical input including, but not limited to, a button press designating approval or denial, a touch screen press, etc.

If the request is not approved 307, the system rejects the request and returns a rejection 309. If the request is approved 307 (or if the request was pre-approved 303), the system then checks to see if monitoring is to be enabled 311. Monitoring the vehicle is discussed in more detail with respect to FIGS. 4 and 5.

If monitoring is enabled 311, the receiving system sets a monitoring status 313 and then returns a request approval and the current vehicle data 315. If there is no need to set the monitoring status, then the receiving system may simply return approval and the current vehicle data 315.

Figure 4:
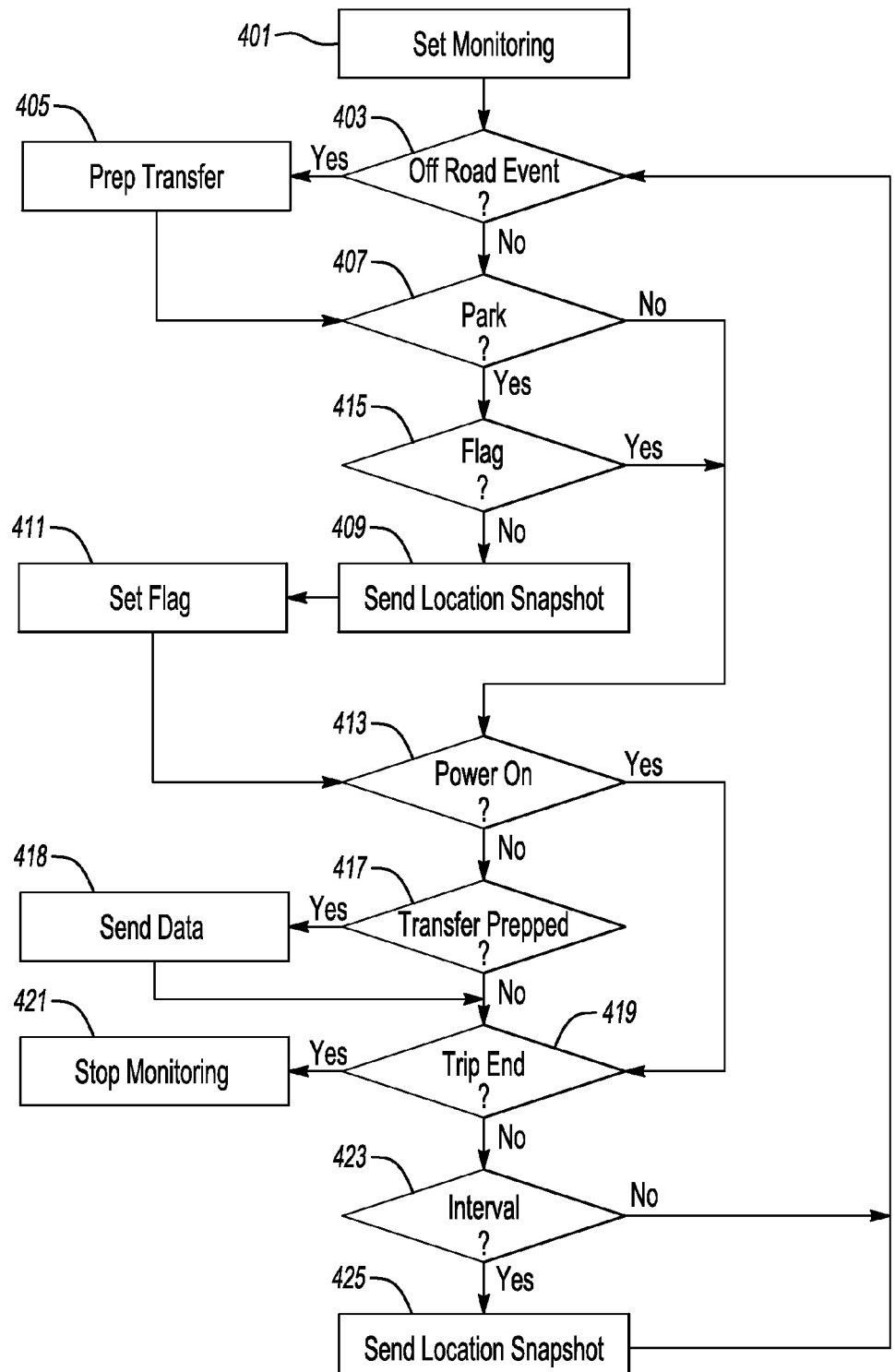
FIG. 4 shows an illustrative example of a vehicle monitoring process.

FIG. 4 shows an illustrative embodiment relating to monitoring the status of the vehicle. In this illustrative embodiment, a querying party has requested vehicle information, and the request has been approved, resulting in the setting of a monitoring status of the vehicle. Monitoring the vehicle may be useful, for example, if the party sends an initial query to determine an estimated arrival time, but then does not wish to check back with the vehicle unless there is an event that may increase that estimated arrival time. Additionally or alternatively, the querying party may wish to receive periodic updates over intervals of distance or time, thus allowing tracking of the vehicle without having to repeatedly send requests for information.

In this illustrative embodiment, the system receiving the request has set the monitoring status of the vehicle to "enabled" and then begins to track the status of the vehicle for various delay events and/or time/distance intervals traveled.

If, for example, an off-road event occurs 403 (where the vehicle's GPS coordinates no longer correspond to a known road), the system may prepare to transfer location data 405 in the event that a vehicle computing or navigation system becomes disabled (due to an accident or a power-down event, for example). If no off road event has occurred, or once the transfer has been prepared in the event the vehicle is powered down, the system then checks to see if the vehicle PRNDL is in a park state 407.

If the PRNDL is not in a park state, then the vehicle may have simply briefly left a known road as a detour (such as cutting through a parking lot) or the vehicle may simply be traveling on an unknown road and thus no "event" update may be needed, as travel time is unlikely to be significantly affected.

If the PRNDL is in a park state 407, then the system may send a current location update and/or a snapshot from one or more of the vehicle's external cameras 409. Since the vehicle was placed in park, it is possible that the trip may be delayed for, for example, 5-10 minutes if gas is being obtained, 20-40 minutes if a food stop is being made, etc. Predicting the duration of a delay is discussed more with respect to FIG. 6, but in this illustrative embodiment, even if there is no predictive algorithm to project a delay, the querying party may be able to guess at a likely delay based on the photograph(s) from the vehicle camera(s) (presumably showing the current location of the vehicle).

In this illustrative embodiment, a flag is also set once the data is sent, so that the data is not sent again at a later point in the process with respect to the same stop, if another condition is met. The flag may be cleared at a suitable time such as, but not limited to, when the vehicle PRNDL is no longer in park, or when the vehicle moves, etc. Thus, if the system detects that the vehicle is in park but a flag is set 415, it will "know" that the relevant data has already been sent for this stop, and can continue on with processing. If the flag is not set 415, then the system can send the relevant data 409, set the flag 411, and proceed with processing.

If the vehicle is not in park, the system then, in this illustrative embodiment, checks to see if the vehicle power is on 413. If the sending/monitoring system is a vehicle computing system, it is possible that it will lose power in the event of vehicle power loss, so in that instance the process may naturally terminate. It is possible, however, that the system maintains limited power on a reserve supply to handle processes of an emergency nature (such as that which is likely occurring if a vehicle is not in park but the power is off) or handle wrap-up processes before all power is lost to the system. In another example, the monitoring system may be provided on a wireless device (in the form of an application, for example) and thus may still be powered even if the vehicle is not.

If the vehicle power is off 413, the system first checks to see if a transfer has been prepped 417. The transfer, in this example, would have been prepped in response to the detection of an off-road event at step 403. If a transfer has been prepped, the system sends the location data/snapshots/any other relevant data 418. The snapshots can be taken at the time the data is sent, or they may be taken as soon as an off-road condition is detected (or at any point in between or beforehand, as is suitable for a particular implementation). Once the data is sent (or not sent), the system checks to see if the trip has ended 419 (e.g., the vehicle has reached a destination).

If the trip is ended 419, monitoring ceases 421, since the vehicle has presumably arrived at the location of the querying party. It may be the case that a vehicle navigation system has a destination programmed therein that is different from the location of the querying party, so in an instance such as this, the trip "end" point may be dictated by the querying party as opposed to the present destination in the vehicle navigation computer.

If the trip has not ended, in this illustrative embodiment, the monitoring system checks to see if a time/distance interval has elapsed 423. This could be a pre-defined interval, or the interval could be defined by the querying party (e.g., without limitation, every fifteen minutes, every ten miles, etc.). If an interval has elapsed, then relevant vehicle data (location, snapshots, etc) is sent to the querying party 425, and then the system returns to monitoring for event data.

Figure 5:
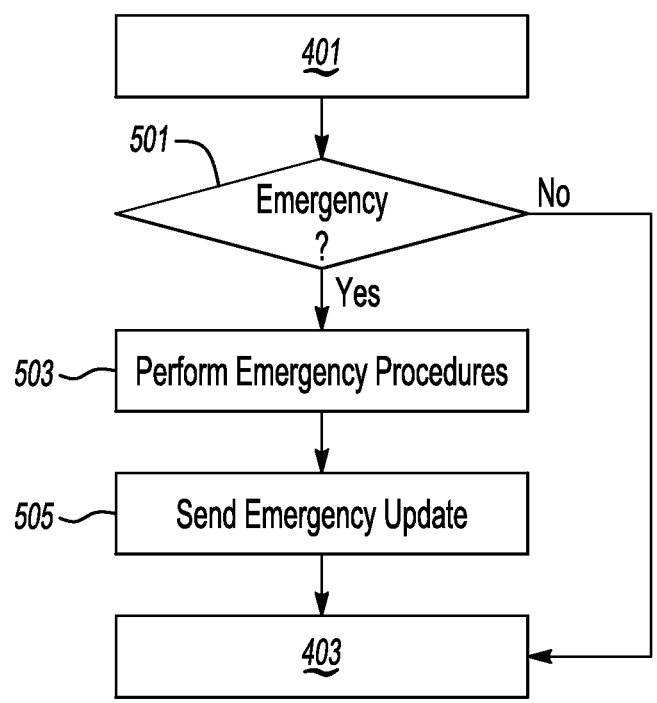
FIG. 5 shows an illustrative example of a process for handling vehicle emergencies.

FIG. 5 shows an illustrative example of a system for handling an emergency condition. If the monitoring system is outfitted with the capability to detect an emergency event, then prior to checking for any other conditions, the system may check to see if an emergency has occurred 501. The monitoring process may default to this process in the event that an emergency occurs at any time, as well. In this illustrative embodiment, the monitoring system, upon detecting an emergency 501, first performs any procedures in accordance with existing emergency procedures 503 (such as, but not limited to, notifying emergency responders, ICE contacts, etc.). Once these procedures are complete, the system will send an emergency update to the querying party 505.

In rare instances, the querying party may be the only person who can locate the traveling party. For example, if the querying party lives off of known roads, and there is an accident in a location that cannot be conveyed to an emergency responder (since road names are not known), sending this update to the querying party may allow that party to then contact the emergency responders and notify them of an estimated location of the vehicle. It is also possible, if pictures are taken using one or more vehicle cameras and transferred, that there is a local landmark that the querying party can use to precisely identify the location of the vehicle and provide assistance to emergency responders in finding the vehicle to aid the occupant(s).

Figure 6:
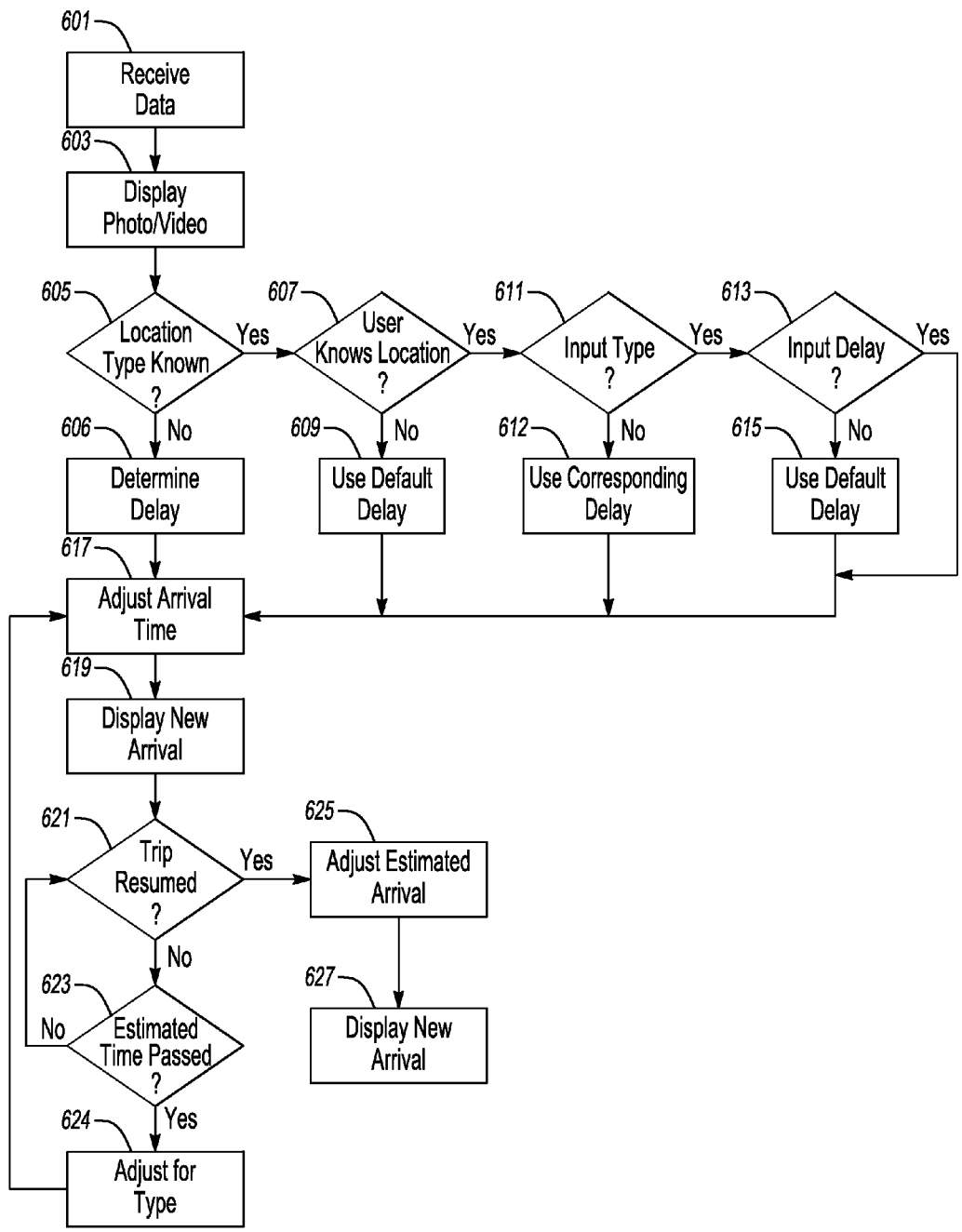
FIG. 6 shows an illustrative example of a destination time adjustment estimation process.

FIG. 6 shows an illustrative embodiment of a process for predicting the delay associated with a vehicle stop along a route. In this illustrative embodiment, a system which sent a query to a vehicle for location information receives back the information and/or one or more snapshots from vehicle camera(s) 601 (video is also possible). One the data has been received, the querying system displays the snapshot (if, for example, the querying system was a smart phone or other display enabled device) 603, or relays the snapshot to a querying party for display 603.

Based on GPS data correlated with known business locations, the system then attempts to determine if a location type is known 605. For example, if a vehicle stops at a location that corresponds to a gas station, then the system may assume that the driver is getting fuel (fuel status of the vehicle can also be used to aid in this determination, as it is unlikely a driver on a full tank would stop for fuel).

Or, if the location status corresponds to a restaurant, then it is likely the driver is stopping for food (again, however, previous data, such as, for example, a restaurant stop just minutes before, may be used to "determine" the purpose of the stop).

If the location type is unknown, or if, for example, a location has dual purposes (such as a gas station/eatery), the system may ask the querying party for information pertaining to the likely cause of the stop 607. For example, if the location is completely unknown, the querying party may be able to identify the location type using the one or more snapshots or video that was sent from a vehicle camera or cameras.

Or, based on which part of the parking lot a vehicle is parked in (known from the camera shots), the user may be able to determine whether a vehicle is stopped for gas or food.

If the user cannot identify the nature of the stop 607, a default delay may be used to adjust arrival time 609 (such as, but not limited to, ten minutes). If the user can identify the location type 611, then a delay corresponding to that location type may be used 612.

Alternatively or additionally, the querying user may simply input an estimated delay time 613 that can then be used to adjust estimated arrival time. If no input is received, a default delay again can be used 615.

Once a delay is determined, either because the system has a delay associated with a known stop location type 606 or because the querying user has assisted in estimating the delay, the process can adjust the estimated arrival time accordingly 617 and display a new estimated arrival time 619.

As long as the trip has not been resumed 621, the system checks to see if the estimated delay time has been exceeded 623. If the estimated delay time is exceeded, and the trip has not been resumed, the system may adjust the estimated delay time 624 and adjust the estimated arrival time 617.

In this illustrative embodiment, as one non-limiting example, a prolonged delay is adjusted based on the type of location (or original duration of delay). For example, without limitation, the system may add five minutes each time if the stop was for food, but only one minute each time if the stop was for fuel. Similarly, if the original stop was for thirty minutes, time may be increased in five minute intervals, whereas if the original stop was projected to take ten minutes, time may be increased in only one minute intervals.

Once the trip has been resumed, the actual delay for the stop is known, and a true adjusted estimated arrival time can be known 625 and displayed 627 (or relayed for display).

This predictive system may not change a host's behavior for short delays such as fuel stops, but if it is known that a traveler is stopping for, for example, a meal, then the host may determine that they have an extra half hour or so before the guest arrives, so they can run a quick errand or otherwise be unavailable until the projected time. If the traveler resumes a journey sooner than expected, an updated arrival time can be sent to a host and they can again adjust their behavior accordingly.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A computer-implemented method:
   receiving a tracking request at a vehicle computing system (VCS);
   notifying a vehicle occupant of the tracking request;
   receiving approval from the vehicle occupant to respond to the request;
   determining a vehicle location;
   transmitting the vehicle location from the VCS to a tracking request associated computing system (TRACS);
   monitoring the vehicle for a delay-event; and
   contingent on the occurrence of a delay-event, transmitting data corresponding to the delay event to the TRACS.

2. The method of claim 1, wherein the receiving a tracking request further comprises:
   determining that a request has been previously approved; and
   automatically approving the request using the VACS, contingent on the determination that the request has been previously approved.

3. The method of claim 1, wherein the VACS is a vehicle computing system.

4. The method of claim 1, wherein the VACS is contained in a wireless device in communication with a vehicle computing system.

5. The method of claim 1, wherein the delay-event includes a vehicle PRNDL being shifted into a Park state.

6. The method of claim 5, wherein the data includes GPS coordinates of the vehicle when the delay-event occurs.

7. The method of claim 5, wherein the data includes identification of a known location corresponding to the GPS coordinates of the vehicle when the delay-event occurs.

8. The method of claim 5, wherein the data includes at least one photograph taken from a vehicle camera system in communication with the VACS.

9. The method of claim 5, wherein the data includes at least one video footage transmission, the video footage being obtained through a vehicle camera system in communication with the VACS.

10. The method of claim 5, wherein delay-event includes the detection of a vehicle accident through one or more vehicle sensors in communication with the VACS.

11. The method of claim 1, wherein the authenticating further comprises:
    receiving an authentication code at the VACS; and
    verifying the authentication code using the VACS.

12. A computer readable storage medium storing instructions that, when executed, cause a vehicle associated computing system (VACS) to execute a method comprising:
    receiving a tracking request at the VACS;
    notifying a vehicle occupant of the tracking request;
    receiving approval from the vehicle occupant to respond to the request;
    determining a vehicle location via a GPS in communication with the VACS;
    transmitting the vehicle location to a tracking request associated remote source (TRACS);
    monitoring the vehicle for at least one delay-event; and
    contingent on the occurrence of at least one delay-event, transmitting data corresponding to the delay event to the TRACS.

13. The computer readable storage medium of claim 12, wherein the VACS is a vehicle computing system.

14. The computer readable storage medium of claim 12, wherein the VACS is a wireless device in communication with a vehicle computing system.

* * * * *